United States Patent [19]

Jandrasi et al.

[11] Patent Number: 4,531,539
[45] Date of Patent: Jul. 30, 1985

[54] CONTROL VALVE FOR FLOW OF SOLIDS

[75] Inventors: Frank J. Jandrasi; Eric P. Ringle, both of Houston, Tex.

[73] Assignee: General Signal Corporation, Stamford, Conn.

[21] Appl. No.: 639,607

[22] Filed: Aug. 10, 1984

Related U.S. Application Data

[63] Continuation of Ser. No. 324,175, Nov. 23, 1981, abandoned.

[51] Int. Cl.³ .............................................. F16K 3/00
[52] U.S. Cl. ................... 137/375; 251/212; 251/326
[58] Field of Search ............... 251/205, 212, 326, 329, 251/327, 328; 137/375

[56] References Cited

U.S. PATENT DOCUMENTS

| | | | |
|---|---|---|---|
| 2,636,712 | 4/1953 | Lubbock | 251/326 |
| 3,654,962 | 4/1972 | Fredd et al. | 251/212 |
| 3,964,507 | 6/1976 | Jandrasi et al. | 137/375 |
| 3,976,094 | 8/1976 | Jandrasi et al. | 137/375 |
| 4,253,487 | 3/1981 | Worley et al. | 251/212 |

FOREIGN PATENT DOCUMENTS

2714933 10/1978 Fed. Rep. of Germany ...... 251/212

Primary Examiner—Martin P. Schwadron
Assistant Examiner—James R. Shay
Attorney, Agent, or Firm—Martin LuKacher

[57] ABSTRACT

Disclosed is a control valve for flow of solids or fluids which controls flow over a full range and provides a full opening for solids dumping. The control valve includes an orifice plate, a pair of slides disposed adjacent to and downstream of the orifice plate which are relatively moveable toward and away from one another to closed and open positions, and a flow control port in one of the slides which is closed when the slides are in the closed position and which is progressively opened as the slides are moved away from one another. An exit liner is provided downstream of the slides which centers flow after passage through the control port protecting the downstream side of the valve body from serious erosion. Guides for the slides are spaced apart at the center of the flow passage in the valve so that any buildup of solids are cleared on closing the slides. The wear prone parts of the valve are removable from the valve for repair or replacement without removing the valve from the line.

12 Claims, 14 Drawing Figures

CONTROL VALVE FOR FLOW OF SOLIDS

This is a continuation, of application Ser. No. 06/324,175, filed 11/23/81 now abandoned.

BACKGROUND OF THE INVENTION

The present control valve is one which is capable of handling the flow of solid and semi-solid material, highly erosive in nature, in temperature ranges from ambient to 200° F. and higher. Such valves find applications in processes handling cold slurries, such as liquefaction or gasification, processes handling raw shale such as the extraction of shale oil, and for handling similar erosive materials such as the catasysts used in refining of crude oil. Numerous design of slide valves have been suggested and used for such solids flow; however, these valves have not been entirely satisfactory since they are not control valves in the true sense in that they are designed to modulate over a narrow flow range, rather than a full controlled range, and they are not capable of providing full pipe opening for solids dumping. The present invention overcomes these disadvantages and provides controlled flow over a full range, closing and complete opening for dumping of solids buildup.

The following patents were developed in a search directed to the present invention: U.S. Pat. Nos. 132,974; 2,787,438; 3,307,574; 3,701,359; 3,976,094; and 4,253,487; and Russian Pat. No. 571,647. None of these patents, however, discloses the inventive combinations, modes of operation and advantageous results thereof as set forth in the claims hereof.

SUMMARY

The present invention is directed to a control valve for flow of solids which controls the volume of flow over a full range and provides a full opening for solids dumping.

In summary, the control valve includes a body with a flow passage through it, and orifice plate removably secured in the flow passage, a pair of slides disposed adjacent to and downstream of the orifice plate and relatively moveable toward and away from one another to a closed position and to a fully open position, respectively, operable to close and to open the flow passage, and a flow control port in one of the slides positioned to be closed when the slides are in the closed position and to be progressively opened as one or both of the slides are moved away from one another. The control valves can either overlap and have the control port in the upstream or downstream slides or the slides can abut one another and have interfitting portions to control the volume of flow in the flow passage. An exit liner can be removably secured in the flow passage downstream of and adjacent to the pair of slides operative to center flow downstream of the orifice, and guides are provided for guiding the slides, the guides and slides having interfitting tongues and grooves. The guides have a spaced portion at the flow passage so that any buildup or bridging of solids in the guides is cleared by the closing of the slides.

The tongues and grooves of the guides and slides are disposed out of the direct flow through the flow passage and, preferably, a flow centering member is provided upstream of the orifice for centering the flow through the orifice. Also, the orifice, slides, guide and exit liner are all removable from the valve through the bonnet opening without removing the valve from the line.

Accordingly, it is an object of the present invention to provide a valve which controls the volume of flow of solids throughout a full range from a fully open to a closed position.

A further object of the present invention is the provision of such a control valve which includes slides at least one of which has a control port for controlling the volume of flow through the valve.

A further object of the present invention is the provision of such a flow valve which includes means for centering the flow of erosive solids through the valve.

A further object of the present invention is the provision of a valve which has a pair of slides and guides having interfitting tongues and grooves, the guides having a space between them at or adjacent the flow passage so that the guides are cleared of any buildup of solids as the slides are moved to a closed position.

A further object of the present invention is the provision of such a control valve where wear prone parts of the valve can be removed for repair or replacement without removing the valve from the line.

Other and further objects, features and advantages will be apparent from the following description of presently preferred embodiments of the invention given for the purpose of disclosure, when taken in conjunction with the accompanying drawings.

DESCRIPTION OF PREFERRED EMBODIMENTS

Figure 1:
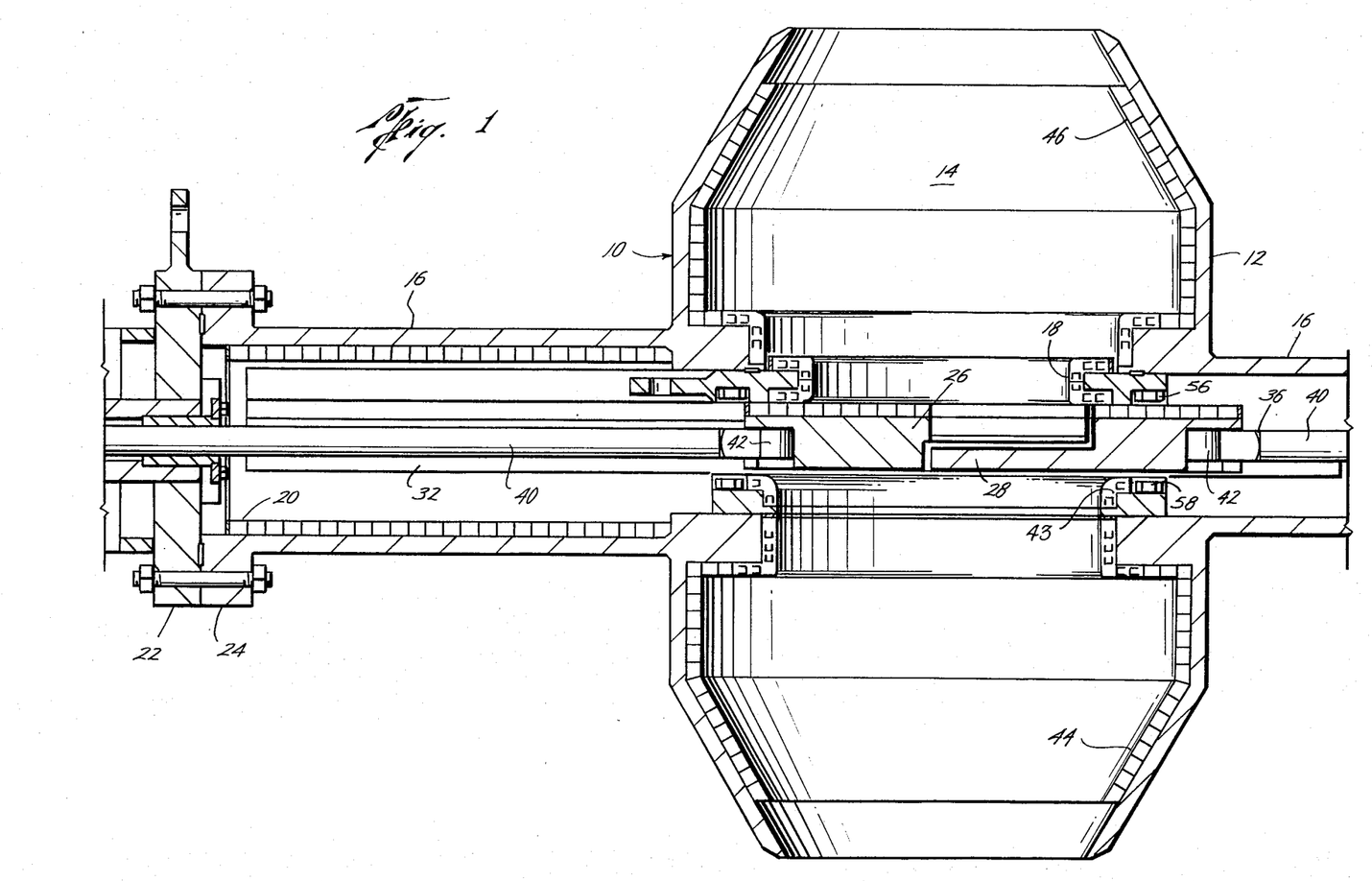
FIG. 1 is an elevation in section of a control flow valve of the invention.
Figure 1A:
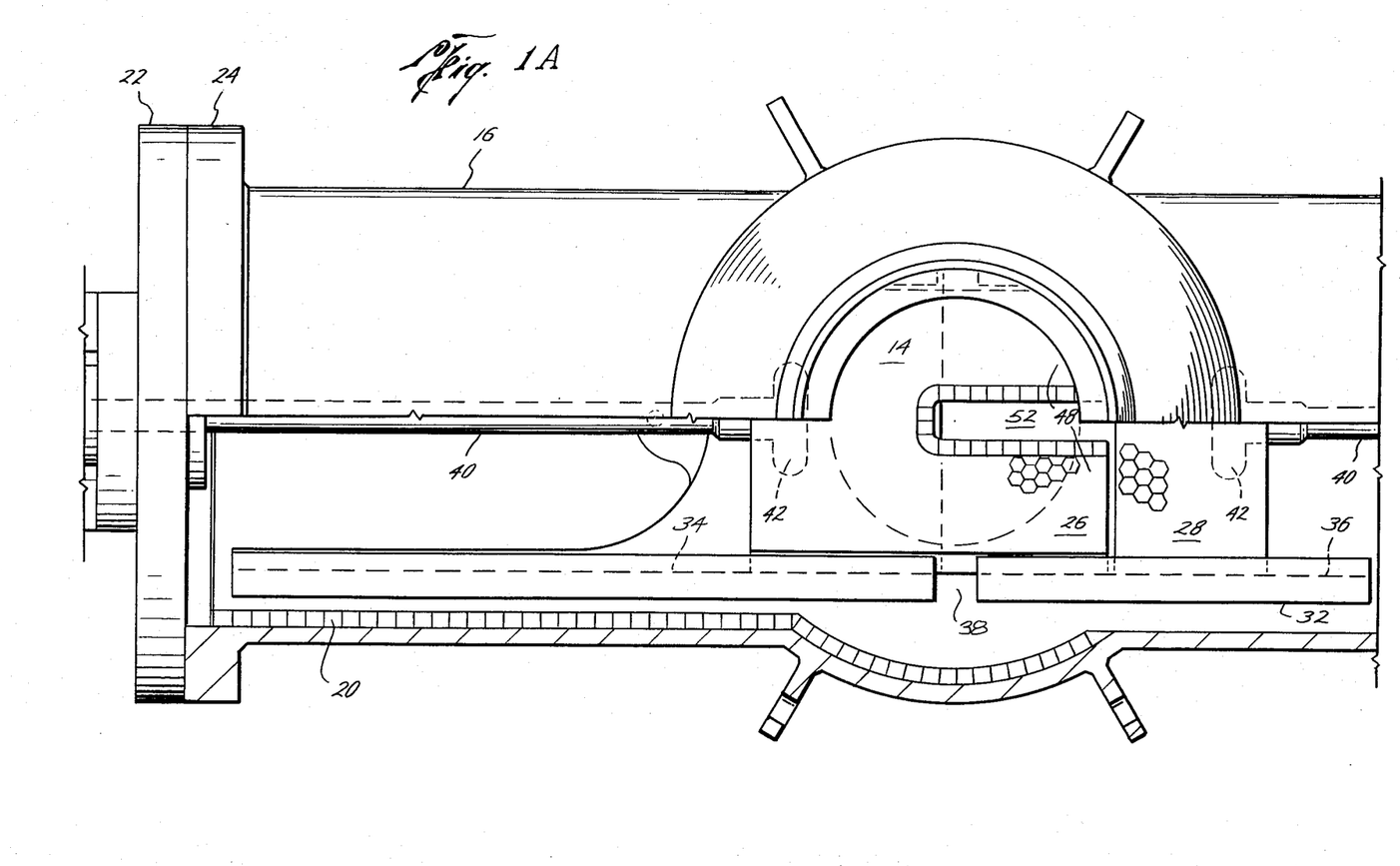
Figure 1A is a plan view of the control flow valve of FIG. 1.

Referring now to the drawings, and particularly to FIGS. 1 and 1A, the reference numeral 10 generally designates the control valve which includes the body 12 having a flow passage 14 through it, an internal chamber 16, and an orifice plate 18 at the entrance to the chamber 16. The chamber 16 has the opening 20 which is closed by the bonnet or cover 22 releasably secured to the body 12 by the bolts 24.

The valve body 12 is the main pressure retaining unit of the valve and serves as a structural mount for the remaining valve components. The body can be either a hot shell design or a cold shell design, as desired. The hot shell design utilizes internal protection on the body walls for erosion only; whereas, the cold shell design utilizes the same erosion resistant refractory material backed by thermal resistant refractory material.

The body may be of fabricated or cast construction, utilizing various forms of steel plates, forgings or castings as required. Typical materials which can be used for the body 12 are carbon steel, such as SA516 for low temperature applications (up to about 900° F.), a low alloy steel such as SA387 for intermediate temperature applications (about 900° F. to 1200° F.), and a high alloy steel, such as SA240 for high temperature applications (up to about 1500° F.). Applications in excess of 1500° F. could utilize a cold shell design to reduce body design temperature to within one of the above ranges. Any desired materials which can withstand the condition of use, however, can be used for the body 12 and for erosion and temperatures encountered.

Disposed within the valve body 12 is a pair of slides 26 and 28, here shown as overlapping slides in closed position, which are disposed in the chamber 16 adjacent to and downstream of the orifice 18. Relatively movement of the slides 26 and 28 toward one another and away from one another positions them in a closed position, in a flow control position and in an open position, respectively, which is operable to close, regulate the volume of flow through and to open the flow passage 14 through the valve 10.

Figure 2:
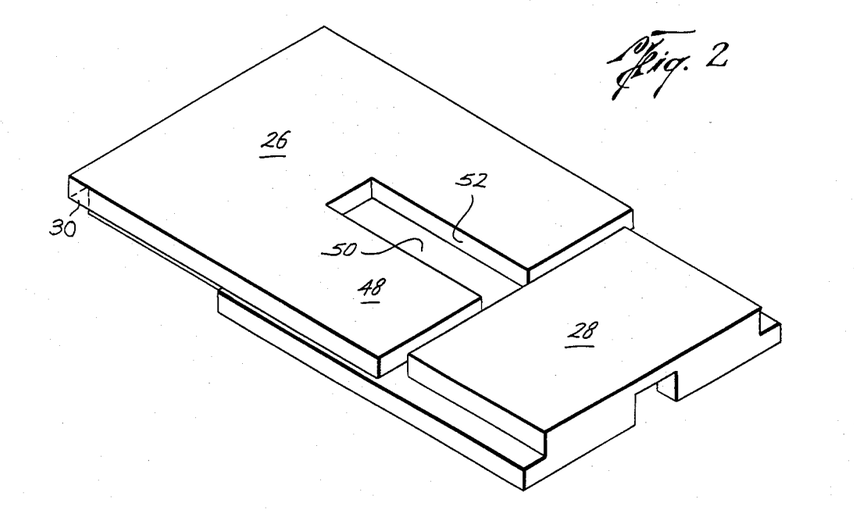
FIG. 2 is a fragmentary view illustrating overlapping slides of the invention in closed position.

As best seen in FIG. 2, the slides 26 and 28 have the tongues 30 on each side of the valve which are disposed in the chamber 16 and out of the direct flow path 14 through the valve 10.

As best seen in FIG. 1A, guides 32 are disposed in the chamber 16 of the body and have the guide slots 34 and 36 which interfit with the tongues 30 on the slides 26 and 28 so that the slides are moveably slideable toward and away from one another as previously described. If desired, of course, the tongues 30 and guide slots 34 can be reversed; that is the tongues can be on the guides 32 and the slots in the slides 26 and 28.

Figure 3:
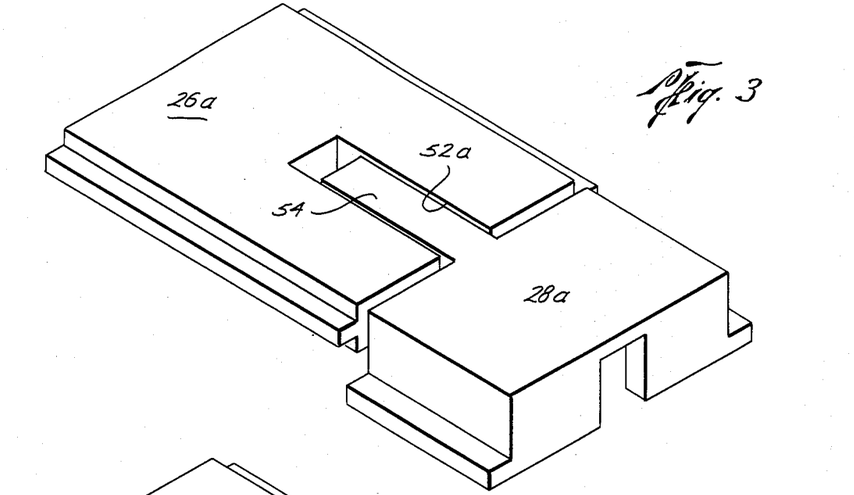
FIG. 3 is a fragmentary view of interlocking slides in a closed position.
Figures 3A, 4:
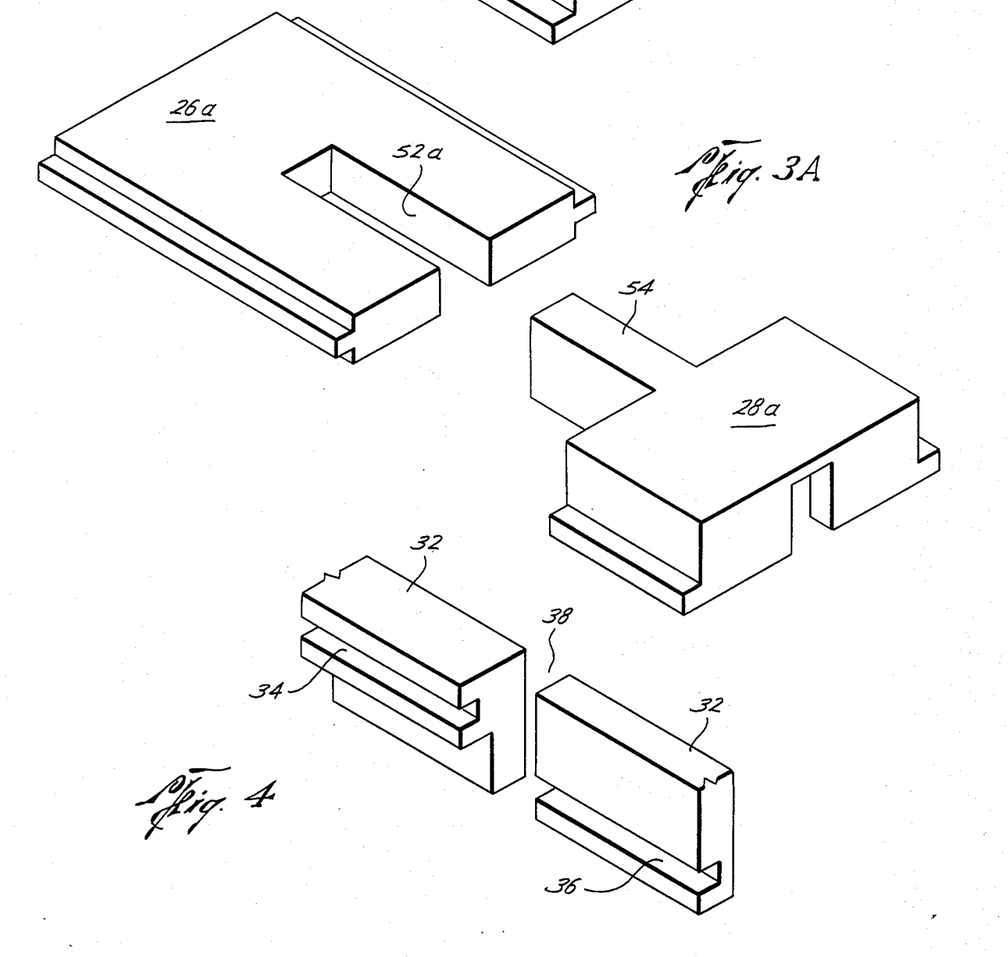
FIG. 3A illustrates the interlocking slides in flow control and in clearing or open positions.
FIG. 4 is a fragmentary perspective view illustrating self-cleaning guides for the interfitting tongues and grooves on the guides and slides.

As best seen in FIG. 4 a space 38 is provided between the guides 32 in the flow path 14 through the valve 10 and, preferably in the center portion, so that any buildup or bridging of solids in the slots 34 and 36 will be cleared by the closing action of the slides 26 and 28 moving toward one another. This buildup occurs when there is a wide variation in particle size of the solids flowing through the valve 10. Preferably this space or gap is about 1 inch to about 3 inch at the flow center line which effectively clears buildup of any solids in the slide grooves by the closing action of the slides.

Any suitable means may be provided for sliding one or both of the slides 26 and 26 into open, flow control and closed position; however, for most commercial operations, valves of the present invention are open and closed remotely as part of the valve system. As illustrated, actuator stems 40 are connected at 42 to each of the slides 26 and 28, which in turn can be connected through stuffing boxes, not shown, to a control actuating assembly of any desired type, such as electric or air operated motors, hydraulic or air operated cylinders, or manual gear boxes, and the like, none of which are shown since any suitable controls in the art can be used. Accordingly, no detailed description of such controls is given or deemed necessary.

Disposed adjacent to and immediately downstream up the slides 26 and 28 is the exit liner 43 which aids in centering flow in the flow passage 14 after it passes through the control port (as subsequently described) in the slides 26 and 28. The exit liner protects the downstream sides 44 of the valve body 12 from serious erosion which otherwise would shorten service life. Preferably, the exit liner 43 is disposed immediately adjacent to the slides 26 and 28 to prevent material from building up in the chamber 16. In this connection a conical extension of the downstream sides 44 is provided downstream of the exit liner 43 for centering flow.

Similarly, buildup in the upstream portion of the valve can be eliminated by providing a conical section 46 in the passageway of 14 to center flow in the upstream portion of the valve 10 which would eliminate buildup of solids in that portion of the valve.

If desired, and as illustrated, various portions of the valve may be insulated with a refractory material for erosion resistance and thermal resistance. Any desired refractory material can be used, many of which are available on the open market, such as Resco RS-7, Resco RA-22 and the like. Also, if desired, refractory material, such as hex mesh and refractory can be utilized.

Figure 2A:
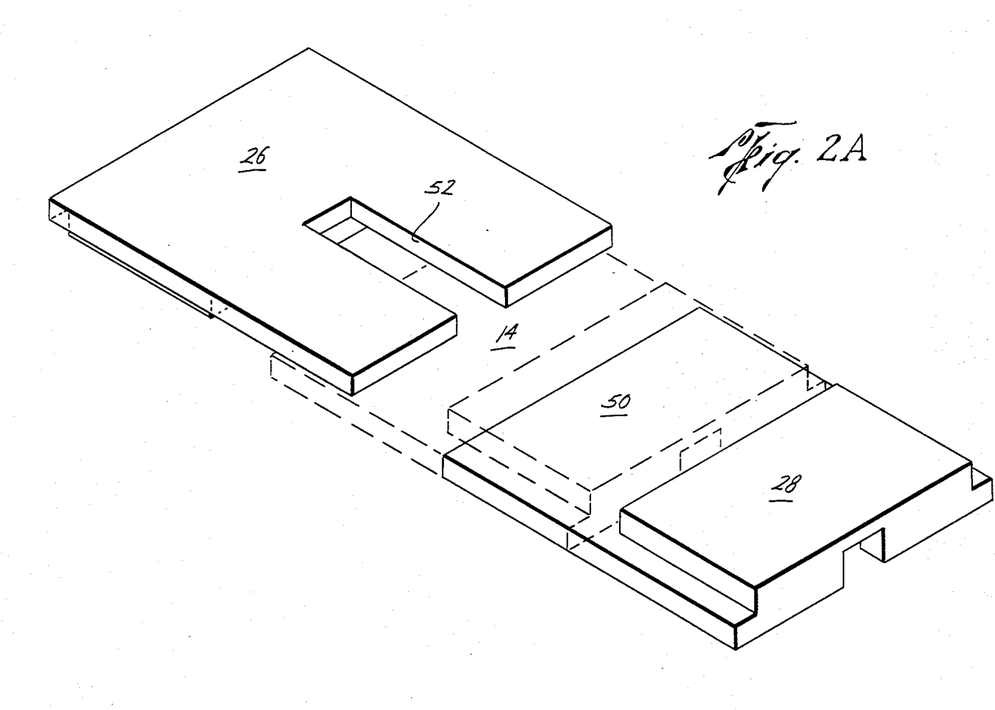
FIG. 2A is a view of the overlapping slides in flow control and in open or clearing positions.

Referring now to FIGS. 2 and 2A, the slides illustrated in FIGS. 1 and 2 have the overlapping portions 48 and 50 provided by cutting away complementary sections of each of them as illustrated. Disposed in one of the slides, here shown as the slide 26, although it can be disposed in the slide 28, is the control port 52, here shown as an elongate slot preferably in the center of the slide valve 26 for centering flow, although it may take a variety of shapes and be disposed in other portions of the slides 26 and 28. Thus, when the slides 26 and 28 abut one another, the control port 52 is closed by the other of the slides. As illustrated in FIG. 2A, the dotted lines illustrate one position of the slides 26 and 28 showing the control port 52 partially open thereby controlling the rate or volume of flow through the control port. The slides 26 and 28 can be moved relative to one another, either both or one of them, to completely open the control port 52 and moved away from the flow passage so that the flow passage 14 is completely opened, or they can be moved any distance desired from one another to control the volume of flow through the valve 10.

As previously mentioned, the control port 52 can take a variety of shapes and locations. Referring now to FIGS. 3 and 3A, a modified form of the control port is illustrated, in which the reference letter a has been added to numerals designating corresponding parts for convenience of reference. In this embodiment, the slides 26 and 28 interlock with one another, that is they generally abut one another in the closed position, and a projection 54 is provided on one of the slides, here shown as the slide 28, to project into the control port 52A of the other of the slide, here shown as slide 26A. The other parts and the operation is the same as that described in connection with FIGS. 3 and 3A, in that movement of the slides 26A and 28A toward one another and in abuting relationship closes the slides, and movement of the slides 26A and 28A away from one another progressively opens the control port 52A until there is a full opening as previously described.

Figure 5:
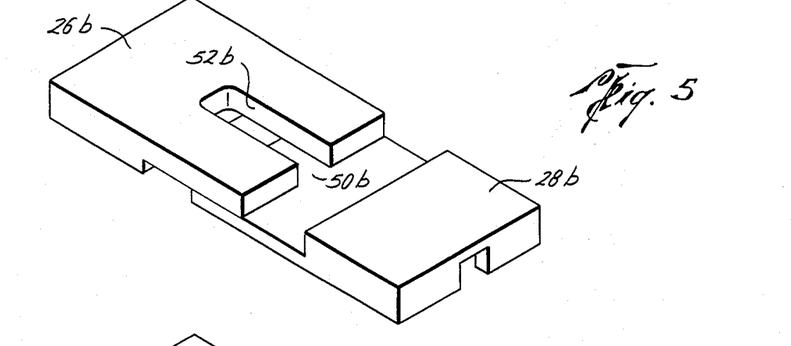
FIG. 5 is a view similar to FIG. 2 illustrating a modified form of the control port.

Referring now to FIG. 5, a still further modification of the control port is illustrated, in which figure the reference letter "b" has been added to numerals designating corresponding parts in FIGS. 2 and 2A. This embodiment is substantially the same as that illustrated in those figures except that a rectangular slot 52b is illustrated having rounded inner corners.

Figure 5A:
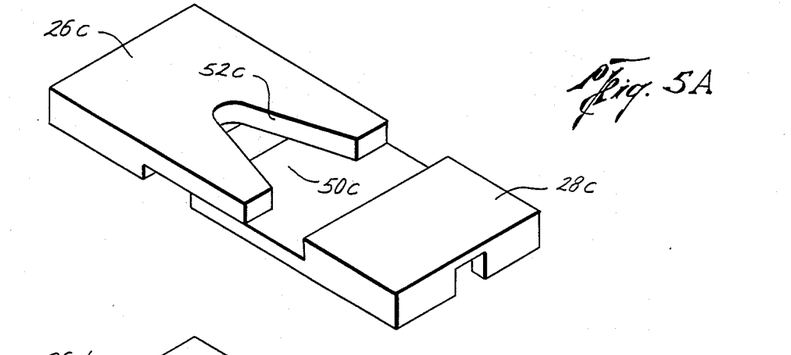
FIG. 5A is a view similar to FIG. 5 illustrating a further modification of the control port.

A still further modification is illustrated in FIG. 5A, to which reference is now made, in which the reference letter "c" has been added to numerals designating parts corresponding to those in FIGS. 2 and 2A. The control port 52c shown here is triangularly shaped rather than an elongate slot or rectangular.

Figure 5B:
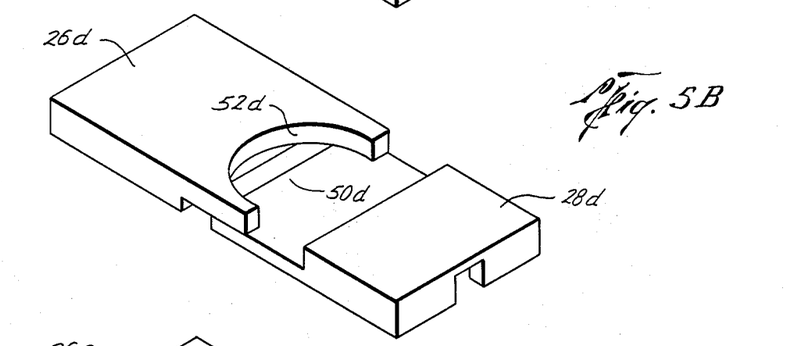
FIG. 5B is a view similar to FIG. 5 illustrating a still further modification of the control port.

Referring now to FIG. 5B in which the reference letter "d" has been added to numerals designating like parts in FIGS. 2 and 2A, a generally rounded control port 52d is illustrated.

Figure 5C:
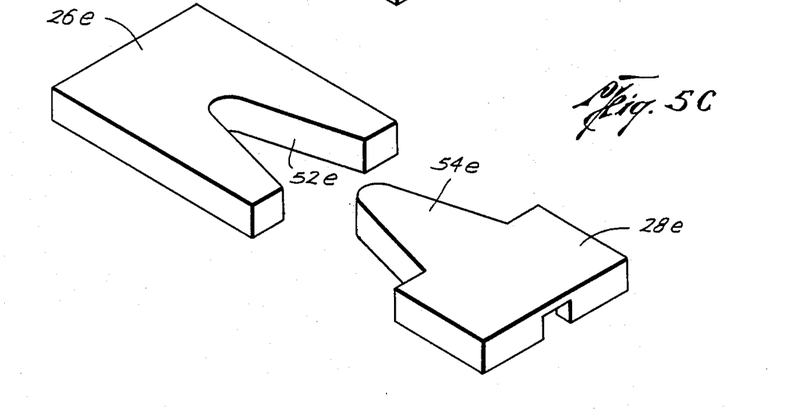
FIG. 5C is a view similar to FIG. 3 illustrating a modification of the control port.

Referring now to FIG. 5C, a further embodiment is illustrated in which the reference letter "e" has been added to numerals designating like parts in FIGS. 3 and 3A. The control port 52e and projection 54e are generally triangularly shaped.

Figure 6:
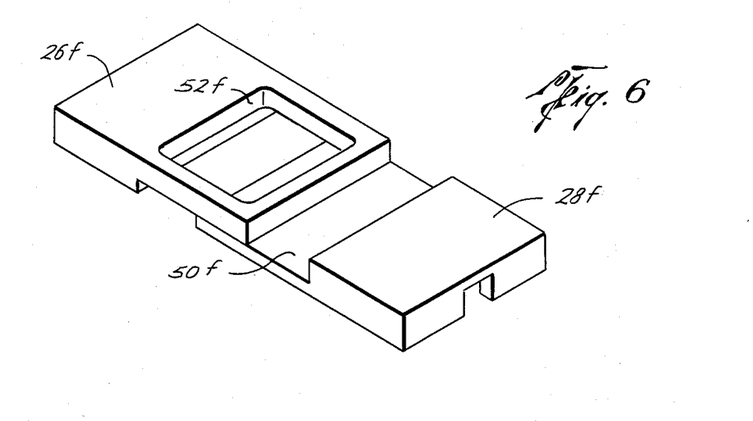
FIG. 6 is a view similar to FIG. 2 illustrating a still further modification of the control port.
Figure 6A:
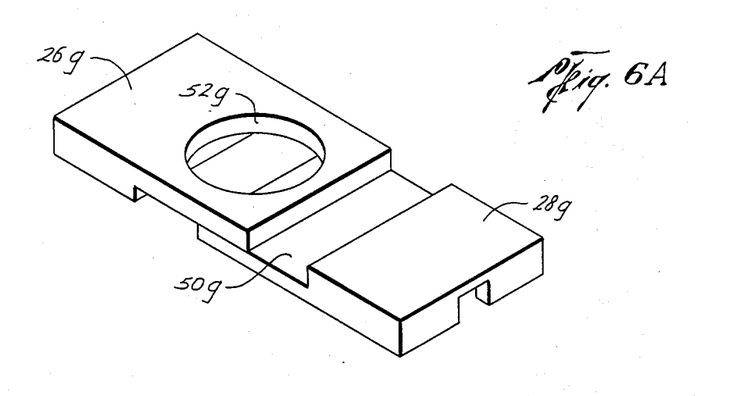
FIG. 6A is a view similar to FIG. 6 illustrating a further modification of the control port.
Figure 6B:
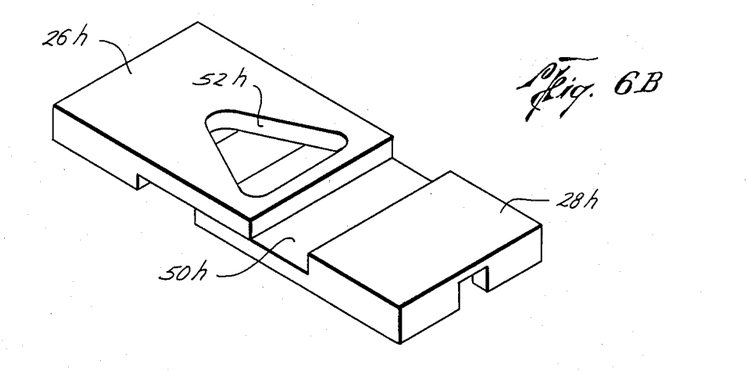
FIG. 6B is a view similar to FIG. 6 illustrating a still further modification of the control port.

Referring now to FIGS. 6, 6A, and 6B, further modifications of the control port are illustrated in which the reference letters "f", "g" and "h" have been added, respectively, to numerals designating like parts in FIGS. 3 and 3A. As shown in these figures, the control port is generally completely enclosed in one of the slides, here shown in a rectangular configuration 52f in FIG. 6, a round configuration 52g in FIG. 5A, and a triangular configuration 52h in FIG. 6B.

Thus, the control port can take a variety of shapes and be positioned in a variety of places depending upon the particular use and circumstances of use and as desired.

For convenience of disclosure, other ports, such as the tongues, etc. have been omitted; however, the other parts and the operation of the control ports illustrated in FIGS. 5, 5A, 5B, 5C, 6, 6A, and 6B are the same as described in connection with FIGS. 3 and 3A so that the valve can be closed, opened for a desired volume of flow, and completely open, as previously described.

By the control port arrangements illustrated, the volume of flow through the valve 10 can be varied, fully opened or closed by varying the position of one or both of the slides 26 and 28. In reducing or shutting off flow, these slides can be closed separately or simultaneously. If desired, and as illustrated, the surfaces of the slides 26 and 28 can be covered with a refractory material, as described, in order to withstand erosions and/or temperatures encountered in flow of solids through the valve 10.

Preferably, the orifice 18, exit liner 43 and the guides 32 are releasably secured in the flow valve 10, such as in the chamber 16 and by the bolts 56 and 58, respectively, and by means not shown for the guides 32. The bonnet opening 20 in the chamber 16 is sufficiently large enough so that all of these parts can be removed for repair and/or replacement through the opening 20 by means of simply removing the cover 22 so that it is unnecessary to remove the valve from the line for repair and replacement of these wear prone parts.

In operation, the valve 10 is connected in a solid flow line by any suitable means, now shown, and flow through the valve 10 is controlled by the position of the slides 26 and 28 relative to one another. As previously mentioned, either one or both of the slides can be moved, and the size of the control port opening increased and decreased by this movement. In addition, the control valve can be closed or it can be fully open to dump any buildup or bridging of solids, and the coacting tongues and grooves in the guides and slides are self-cleaning simply by closing the slides.

Also, if desired the valve 10 can be reversed in use, so that the direction of flow through it is reversed. In addition, while the valve 10 is particularly suited for use with flow of solids, it is useful for controlling flow of fluids.

The present invention, therefore, is well suited and adapted to attain the objects and ends and has the advantages and features mentioned as well as other inherent therein. While presently preferred embodiments in the invention have been given for the purpose of disclosure, changes can be made therein which are within the spirit of the invention as defined by the scope of the appended claims.

What is claimed is:

1. A flow control valve comprising,
a body provided with a flow passage therethrough,
an orifice plate removably secured in the flow passage,
a pair of slides disposed adjacent to and downstream of the orifice plate and relatively moveable toward and away from one another to a closed position and to an open position, respectively, operable to close and open the flow passage,
a flow control port in one of the slides permitting flow therethrough positioned to be closed when the slides are in the closed position and to be progressively opened as the slides are moved away relative to one another, and
guides in the body, and interfitting groves and tongues in and on the guides and the slides disposed out of flow through the flow passage,
there being a space between the guides at the flow passage whereby closing of the slides clears any build up of solids in the guides.

2. The flow control valve of claim 1 where,
the guides comprise a separate guide for each of the slides.

3. A flow control valve comprising,
a body provided with a flow passage therethrough,
a chamber in the body disposed about and in fluid communication with the flow passage,
a valve orifice removably disposed in the flow passage upstream and adjacent to the chamber,
a pair of slides disposed in the chamber downstream of and adjacent to the orifice, the slides being slideable to and away from one another to a closed position and to an open position, respectively, and
guides in the chamber, the guides and the slides having interfitting tongues and grooves disposed out of direct flow in the flow passage,
there being a space between the guides at the flow passage whereby any buildup of solids is cleared upon moving the slides to the closed position.

4. The flow control valve of claim 3 where,
the guides comprise a separate guide for each of the slides, and
the guides are removably disposed in the chamber.

5. A flow control valve comprising,
a body provided with a flow passage therethrough,
a chamber in the body disposed about and in fluid communication with the flow passage,
a valve orifice removably disposed in the passageway upstream of and adjacent to the chamber, a pair of slides disposed in the chamber downstream of and adjacent to the orifice, the slides being slideable to and away from one another to a closed position and to an open position, respectively, a flow control port in one of the slides permitting flow therethrough positioned to be closed when the slides are in the closed position and to be progressively opened as the slides are moved away from one another, and guides in the chamber, the guides and the slides having interfitting tongues and grooves disposed out of direct flow in the flow passage, there being a space between the guides at the flow passage whereby any buildup of the solids is cleared upon moving the slides to the closed position.

6. The flow control valve of claim 5 where, the guides comprise a separate guide for each of the slides, and the guides are removably disposed in the chamber.

7. A flow control valve comprising, a body provided with a flow passage therethrough, a chamber in the body disposed about and in fluid communication with the flow passage, a valve orifice removably disposed in the flow passage upstream of and adjacent to the chamber, a pair of slides disposed in the chamber downstream of and adjacent to the orifice, the slides being slideable to and away from one another to a closed position and to an open position, respectively, a flow control port permitting flow therethrough in one of the slides positioned to be closed when the slides are in the closed position and to be progressively opened as the slides are moved away from one another, guides in the chamber, the guides and the slides having interfitting tongue and grooves disposed out of direct flow in the passageway, the guides being spaced apart from one another adjacent the flow passage whereby any buildup of solids is cleared upon moving the slides to the closed position, and an exit liner downstream of and adjacent to the pair of slides operative to center flow in the flow passage downstream of the orifice plate.

8. The flow control valve of claim 7 where, the control port comprises an elongate slot.

9. The flow control valve of claim 7 where, the slides overlap one another, and the control port comprises an elongate slot.

10. The flow control valve of claim 7 where, the slides abut one another, and the control port comprises an elongate slot in one of the slides and a corresponding projection in the other of the slides.

11. The flow control valve of claim 7 where, the orifice plate, the guides and the exit liner are all releasably secured in place, the chamber has an opening of a size sufficient for removal of the guides, the slide valves, the exit liner and the valve orifice therethrough, and a cover relesably covering the opening.

12. The flow control valve of claim 7 including, a truncated conical section disposed in the passageway upstream of and adjacent to the valve orifice operative to prevent buildup of solids in an upstream portion of the flow passage.

* * * * *